N. WHITEHALL.
Wheel Cultivator.
No. 24,071.
Patented May 17, 1859.
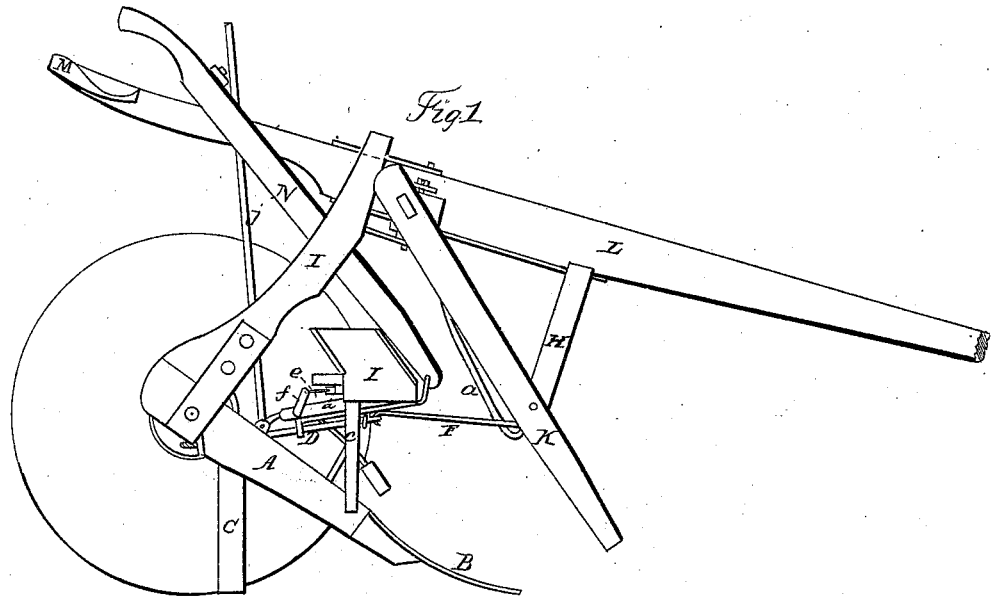
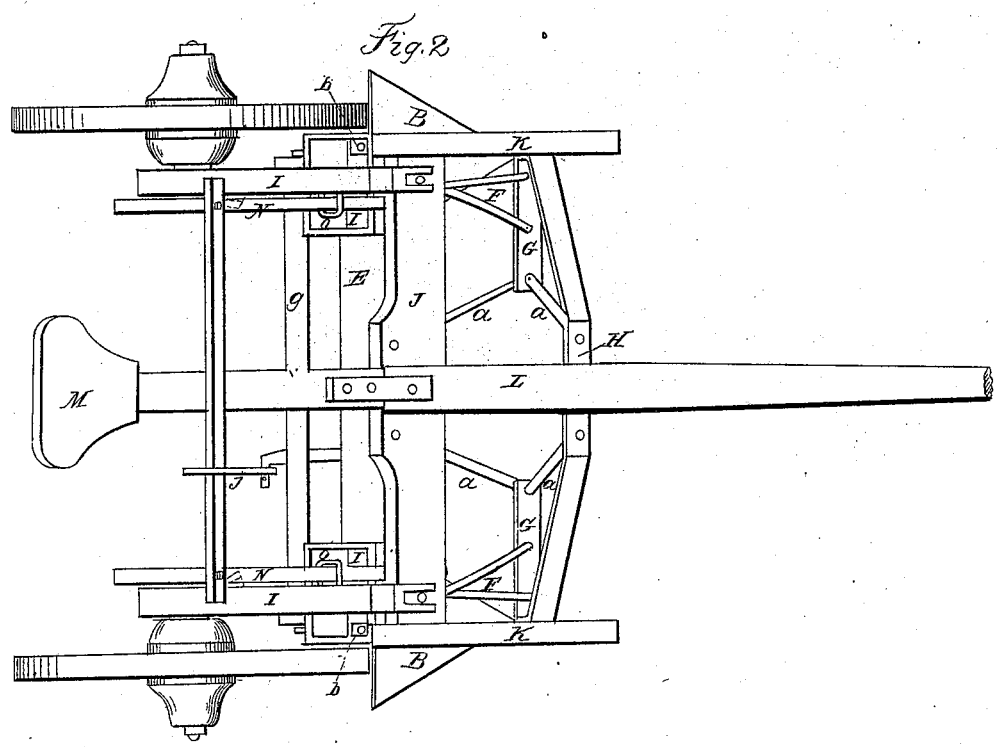

UNITED STATES PATENT OFFICE.

NICHOLAS WHITEHALL, OF NEWTOWN, INDIANA.

IMPROVEMENT IN SEEDING-CULTIVATORS.

Specification forming part of Letters Patent No. 24,071, dated May 17, 1859.

*To all whom it may concern:*

Be it known that I, N. WHITEHALL, of Newtown, in the county of Fountain and State of Indiana, have invented certain new and useful Improvements on Combined Plow and Planter, the construction and operation of which I have described in the following specification and illustrated in the accompanying drawings with sufficient clearness to enable competent and skillful workmen in the arts to which it pertains or is most nearly allied to make and use my invention.

My said invention relates to the combination of the handles with stirrups in such a manner as to enable me to raise and secure the plows above the surface of the soil and facilitate the labor in transporting the machine from one place to another without the liability of obstruction by catching the plow in the earth.

In the accompanying drawings, Figure 1 is an elevation, viewed from the right side, with the wheel removed to show more clearly its several parts, in which may be seen that portion of the frame A to which the plowshare B is attached, likewise the seed-cover C, also the axle of the wheel upon which the machine is mounted.

Passing diagonally through the frame A is the eyebolt D, which supports the cross-bar E, (seen more clearly in Fig. 2,) which is a bird's-eye view of the machine. F F are forked hooks, hinged to eyebolts D and hooked to plates G G, which form a part of the arch-brace H, and are also supported from the brace H by rods *a a a a*.

On cross-bar E, at each end, is a box or receptacle, I, in which the seed to be planted is placed. In the bottom of each box is an opening, *b b*, communicating with the funnel *c*, which is so arranged as to conduct the seed to the furrow behind the share B.

Under the bottom of each box is a valve, for the purpose of admitting or preventing the seed to escape, as seen in Fig. 1, and connected by a link, *e*, to a lever, *f*, at each end of the rock-shaft *g*, and to which also is attached the rod *j*.

*i i* are standards hinged to the frame A, and serve as supports for the upper cross-bar, J. K K are braces to which the whiffletrees are designed to be attached. L is the tongue; M, the conductor's seat. N N are handles by which the plows are guided and raised from the soil. O O are stirrups encompassing the handles, and serve as a support to them when the plows are in an elevated position. On each handle is a notch, which enters upon the foot of the stirrups and secures them in the required position.

Operation: In conducting the combined planters with the plow while being drawn through the soil, the operator gives to the rod *j* a vertical reciprocating motion, which transmits through the levers *f* a horizontal reciprocating motion to the valves *d*, causing an alternate opening and closing of the aperture in the box L, likewise an intermitting deposit of seed.

When it is desired to transport the machine from one place to another, the plows are elevated from the soil by drawing back the handles until the notch in each admits them to fall upon the foot of the stirrups, thus securing the plows in an elevated position and facilitating the labor in moving from one place to another without the liability of catching the plows in the soil.

This mode of adjusting the dip of the plows may also be used to advantage in regulating their depth of operation, as by an arrangement of the notches in the handles for that purpose the action of the plow in this respect may be adjusted in a moment by simply operating the handles N N.

Having thus fully described my said invention, the particular improvements which constitute it, and which I claim as having been originally and first invented by me, is—

The particular improvement which constitutes my said invention, and which I claim as having been originally and first invented by me, is the combination of the stirrups O O with the notched handles N N, eyebolts D, and hooks F F, by which I am enabled to raise and secure the plow at any desired height, substantially as set forth, not intending to claim broadly a device as such by which the plow may be raised out of the ground, but only the specific combination of parts above recited for the purposes stated.

NICHOLAS WHITEHALL.

Witnesses:
SAMUEL REEVES,
WILLIAM HUTSON.